United States Patent [19]

Schwab et al.

[11] Patent Number: 4,988,265
[45] Date of Patent: Jan. 29, 1991

[54] PLATE PUSHING DEVICE MOUNTED ON A HORIZONTALLY MOVABLE CARRIAGE

[75] Inventors: Burkhard Schwab, Calw-Alzenberg; Erwin Jenkner, Gechingen, both of Fed. Rep. of Germany

[73] Assignee: Holzma-Maschinenbau GmbH, Calw-Holzbronn, Fed. Rep. of Germany

[21] Appl. No.: 464,288

[22] Filed: Jan. 12, 1990

[30] Foreign Application Priority Data

Jan. 20, 1989 [DE] Fed. Rep. of Germany ....... 3901537

[51] Int. Cl.$^5$ .............................................. B65G 59/02
[52] U.S. Cl. .................................. 414/796.8; 271/130; 414/796
[58] Field of Search ................... 414/790.3, 795.7, 796, 414/796.7, 796.8; 271/42, 150, 152, 154

[56] References Cited

U.S. PATENT DOCUMENTS

| | | | |
|---|---|---|---|
| 4,431,358 | 2/1984 | Jenker | 414/796.8 X |
| 4,714,395 | 12/1987 | Benuzzi et al. | 414/796 |
| 4,726,724 | 2/1988 | Jenkner | 414/119 |

FOREIGN PATENT DOCUMENTS

| | | |
|---|---|---|
| 7606142 | 6/1976 | Fed. Rep. of Germany . |
| 2549234 | 2/1977 | Fed. Rep. of Germany . |
| 3515729 | 12/1988 | Fed. Rep. of Germany . |

*Primary Examiner*—Robert J. Spar
*Assistant Examiner*—Craig Slavin
*Attorney, Agent, or Firm*—Dick and Harris

[57] ABSTRACT

A plate pushing device for pushing one or more workpiece plates off of a stack of workpiece plates resting on a lifting platform and into a woodworking machine, such as a plate saw. A pushing element is arranged for free vertical movement on a horizontally driven carriage. A support roller, coupled with the pushing element, extends below the pushing element to ride along the upper surface of the uppermost remaining workpiece plate and continuously maintain at least a predetermined space between the pushing element and the upper surface of the uppermost remaining workpiece plate, to preclude damage to the uppermost remaining workpiece plate by the pushing element during its pushing movement. A measuring device is provided on the carriage to detect the height of the lifting platform.

2 Claims, 3 Drawing Sheets

PLATE PUSHING DEVICE MOUNTED ON A HORIZONTALLY MOVABLE CARRIAGE

BACKGROUND OF THE INVENTION

The present invention relates to plate pushing devices for wood working equipment, and in particular to a plate pushing device positioned on a horizontally-movable carriage for pushing plate-shaped workpieces off of a lifting platform, into woodworking machines such as plate saws. The present invention also relates in particular to plate pushing devices which include a vertically movable pushing element, that is directed against an edge of one or more workpiece plates and which is arranged to move vertically with a support member that rides along the surface of a workpiece plate, during the pushing motion of the pushing element, to maintain the pushing element at least a constant predetermined distance above the uppermost remaining workpiece plate on the lifting platform, to preclude injury to the upper surface of the uppermost remaining workpiece plate.

An example of a prior art plate pushing device may be seen in U.S. Pat. No. 4,726,724 to Jenkner, issued Feb. 23, 1988 claiming priority of German Patent Application No. DE35 15 729. In these references, a plate pushing device is disclosed in which a pushing element (feed member) is movably supported on a vertical guide which is carried on a horizontally movable carriage. The pushing element (feed member) is selectively fixable along the vertical guide by clamping means. A support member is also arranged within the carriage for movement along a vertical guide. Clamping means are provided to enable selective fixing of the support member at any position along its vertical guide, as well. Accordingly, the support member is operably coupled to the pushing element by such clamping means so that the support member and pushing element so as to move in tandem along the vertical direction.

Attached to the forward end of the support member is a roller that is in contact with the upper surface of the uppermost workpiece plate resting on the lifting platform. The support member also carries a vertically arranged bar shaped information member, which cooperates with a stationary scanning device, to produce an indication of the vertical movement of the pushing device, resulting from the lifting movement of the lifting platform. The indication of the elevation of the lifting device is converted into a signal which is fed into the control for the lifting device for the lifting platform, so that, when the lifting platform has been raised to a height corresponding to the desired number of workpiece plates to be pushed off of the lifting platform, the signal causes the lifting device to stop its lifting movement.

During the lifting movement of the lifting device, the support arm of the prior art plate pushing device is uncoupled from the pushing element, so that the pushing element does not move vertically. After the lifting movement of the lifting device is completed, the support member and the pushing element are again coupled, so that during the subsequent pushing movement of the pushing element, the support member continues to ride atop the uppermost plate of the plate or plates being pushed and maintains the pushing element a substantially uniform distance above the upper surface of the upper workpiece on the stack of remaining workpiece plates. As the workpiece plates being pushed pass over the remaining plates, irregularities in the surface of the uppermost remaining plate will be transmitted through the stack being pushed and cause the support member to move up or down, causing the pushing element to move up or down and remain a predetermined distance above the upper surface of the uppermost remaining plate.

However, such prior art plate pushing devices require at least two clamping means which themselves require the presence of external power supplies and external or automatic control devices for their operation. Such additional devices add to the cost, size, and complexity of the plate pushing device. An additional potential limitation of such prior art plate pushing devices is that they rely upon transmission of the irregularities through the stack of plates being pushed, to the support member, for detection of the irregularities and maintenance of the pushing member the necessary distance above the surface of the uppermost remaining plate to avoid damage to the uppermost remaining plate.

It is, accordingly, an object of the invention to provide a plate pushing device, carried by a horizontally movable carriage, which is equipped with a support member arranged to prevent injury to workpiece plates by the pushing element of the plate pushing device during the pushing movement of the pushing element.

It is an additional object of the invention to provide such a plate pushing device which requires a minimum number of external controls or power supplies, so as to reduce the cost, size, and complexity of the plate pushing device.

Another object of the invention is to provide such a plate pushing device which detects the presence of irregularities in the surface of the uppermost remaining plate directly, to more accurately and consistently maintain the pushing element above the just-described upper surface and preclude damage thereto by the pushing element.

These and other objects of the invention will become apparent in light of the present specification, drawings and claims.

SUMMARY OF THE INVENTION

The present invention comprises a plate pushing device for pushing one or more workpiece plates of a stack of plates resting on a lifting platform, along a forward feed direction. The height of the lifting platform is adjustable by a lifting device to vary the number of plates brought into position to be pushed during a particular pushing motion by the plate pushing device. The plate pushing device is arranged upon a horizontally movable carriage.

The plate pushing device further comprises a pushing element which is operably arranged on the carriage for vertical movement. The pushing element is configured to be applied to an edge of a workpiece plate or a side of a stack of workpiece plates. A support roller is operably associated with a pushing element to support the pushing element and move the pushing element vertically during the pushing movement of the plate along the forward feed direction. The support roller and the pushing element are coupled to each other for simultaneous, substantially free, vertical movement relative to the carriage. A portion of the support roller extends downwardly a predetermined distance below a lowermost portion of the pushing element. In this way, the pushing element is maintained a substantially uniform distance above the upper surface of the uppermost plate remaining on the lifting platform during the particular pushing operation.

A measuring device, including a vertically adjustable information element, is arranged on the carriage and associated with the lifting platform si as to detect the height of the lifting platform and send a signal to the lifting device of the lifting platform, once the platform has attained a preselected height, to instruct the lifting device to stop its lifting movement. In a preferred embodiment of the invention, the information element is operably arranged on the carriage, in front of the pushing element, relative to the forward feed direction.

In a preferred embodiment of the invention the information element comprises a guide cylinder operably arranged in vertical orientation on the carriage. A piston is located inside the guide cylinder, arranged for vertical movement relative to the guide cylinder. Emanating from an upper end of the piston is an upper piston rod which extends through and above an upper end opening of the guide cylinder. A gauging member is configured upon an upper end of the upper piston rod. When the piston undergoes vertical movement, the gauging member rotationally drives a roller which is operably connected to a incremental rotation sensing device. The incremental rotation sensing device generates and transmits a signal to the lifting device in response to vertical movement of the piston, so that when the signal representing attainment of a preselected height for the lifting platform is received by the lifting device, the lifting movement of the lifting platform is interrupted.

DETAILED DESCRIPTION OF THE DRAWINGS

Figure 1:
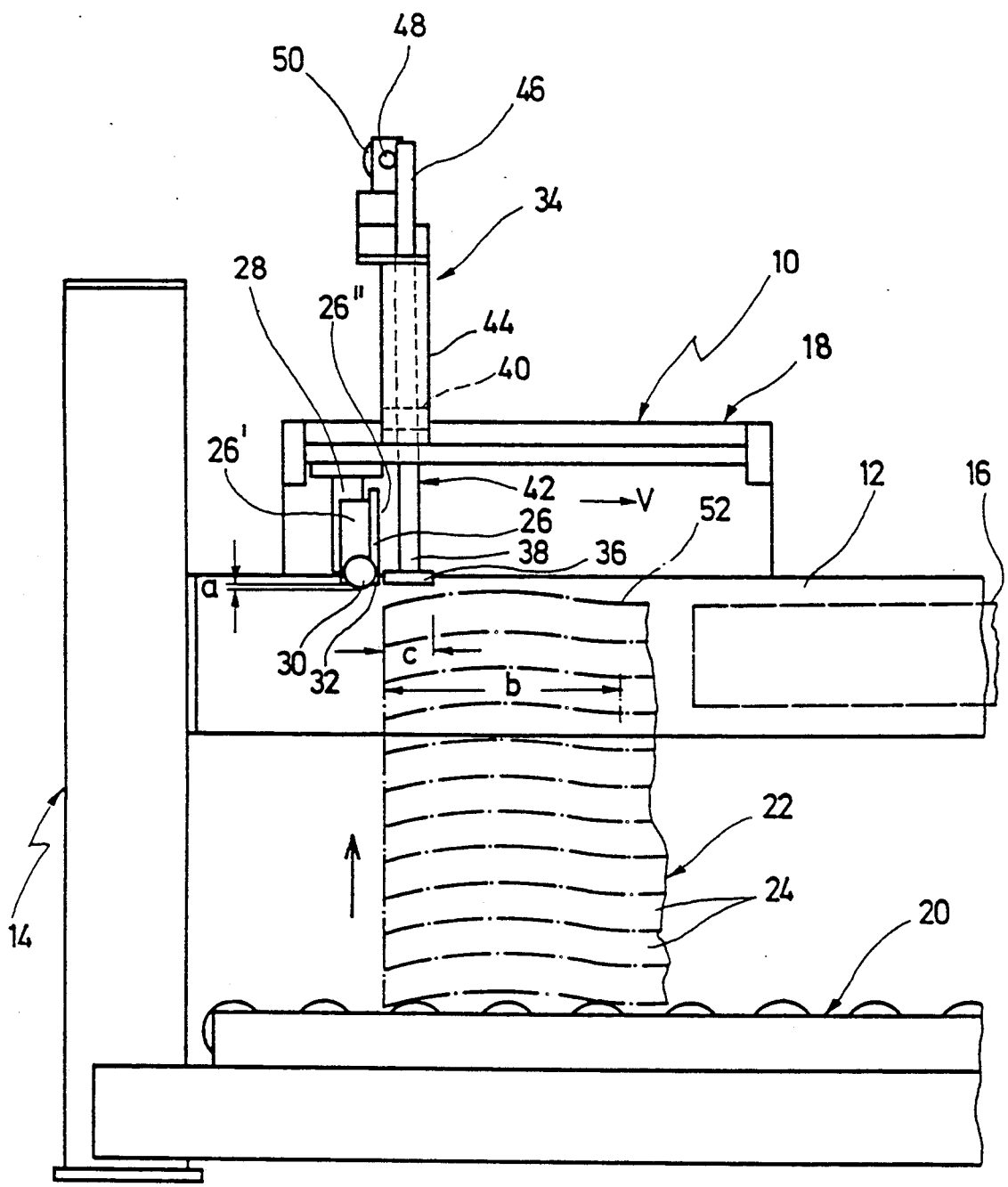
FIG. 1 is a side elevation of a plate pushing device, arranged on its carriage, in an initial position, according to a preferred embodiment of the invention.

While this invention is susceptible of embodiment in many different forms, there is shown in the drawings and will herein be described in detail, a specific embodiment, with the understanding that the present disclosure is to be considered as an exemplification of the principles of the invention and is not intended to limit the invention to the embodiment illustrated.

A plate pushing device 10 is seen in a side elevation in FIG. 1. Plate pushing device 10 rests on a carriage 18 which is driveable along a horizontal guide rail 12. Horizontal guide rail 12 forms part of the guide framework of forward feed device 14, for loading individual plate-shaped workpieces or stacks of workpiece plates onto machine platform 16 of a woodworking machine such as a plate saw. Forward feed device 14 also delivers the workpiece plates to the plate saw to ensure positive movement of the workpiece plates along the forward feed direction, which is indicated by the horizontally-extending arrow V in FIG. 1.

Plate pushing device 10 may be propelled along the forward feed direction, by any suitable apparatus, such as, for example, a chain conveyer. In addition, plate pushing device 10 might also be carried between two guide rails which transversely overlap machine platform 16. As another alternative, several plate pushing devices 10 may be supported by a transversely extending carriage between two guide rails extending along the forward feed direction, as may be seen, for example, in U.S. Pat. No. 4,726,724 or German Pat. Apln. PS 35 15 729.

Carriage 18 as shown in FIG. 1, is positioned in its initial position above lifting platform 20, onto which stack 22 of workpiece plates 24 are placed. Lifting platform 20 is selectively raiseable and lowerable by a lifting device (not shown) which may be of any suitable form, such as a compressed fluid piston, or a chain drive, and may be held fixed at any selected elevation. The lifting device may be controlled in any suitable manner, preferably in a program-controlled manner. As described hereinafter, plate pushing device 10 can push individual workpiece plates 24 or groups of workpiece plates, from lifting platform 10 along the forward feed direction toward a plate saw (not shown). Plate pushing element 26 is supported on guide member 28 for vertical movement relative thereto. Ball or roller bearings may be provided between guide member 28 and adjacent side parts 26', of pushing element 26, to freely support pushing element 26 on guide member 28. Alternatively, a sliding bearing may be used. As a result of the above construction, pushing element 26 ordinarily occupies a lowermost position on guide member 28, as seen in FIG. 1, in the absence of any upwardly-directed force acting upon it.

Support roller 30 is operably supported for substantially free rotation on pushing element 26. The lowermost surface of the periphery of support roller 30 projects, in the downward direction, somewhat below lower face 32 of pushing element 26. The distance by which support roller 30 extends below lower face 32 of pushing element 26 is indicated in the Figures, by the vertical distance designated "a". Lower face 32 precedes support roller 30 as plate pushing device 10 moves along the forward feed direction. As an alternative form of construction, support roller 30 may be replaced with a suitably mounted bearing positioned in lower face 32 of pushing element 26, or as a continuous, tread bearing band.

During the operation of the plate pushing device 10, stack 22 of workpiece plates 24 is raised by lifting platform 20 upward toward plate plate pushing device 10. The number of plates or stacks of plates to be pushed from lifting platform 20 onto machine table 16, during a particular movement of plate pushing device 10, is determined by the height which lifting platform 20 is raised, relative to machine platform 16. Accordingly, measuring device 34 is provided to preselect and monitor the desired lifting height attained by lifting platform 20. Measuring device 34 rests on carriage 18, but is configured to operate independently of the vertical movement of pushing element 26. Measuring device 34 includes guide cylinder 44, which is vertically arranged on carriage 18. Piston 40 is fitted into guide cylinder 44 for vertical movement within and relative to guide cylinder 44. In addition, piston 40 is configured to be selectively driveable, upwardly or downwardly, for example by compressed air, as well as selectively being free floating. Piston rod 42 extends downwardly from the lower end of piston 40, and includes lower piston rod segment 38. Sensing member 36, preferably in the form of a plate shaped member, emanates from the lower end of lower piston rod segment 38. In a manner to be described later, piston 40 is configured to be driven upwardly, as the result of upward movement of lifting platform 20, with sensing member 36 resting on the upper surface 52 of the uppermost workpiece plate on lifting platform 20. In order to measure the vertical movement of piston 40, an incremental rotation-sensing device 50 is positioned adjacent upper piston rod segment 46. Roller 48 projects from incremental rotation-sensing device 50 and engages, in rolling contact, a gauging surface of upper piston rod segment 46. Preferably, roller 48 has a slightly tapered conical configuration. Accordingly, as piston 40 moves up or down, the gauging surface of upper piston rod segment 46 rotationally drives roller 48, which transmits the rotation to incremental rotation-sensing device 50. Incremental rotation-sensing device 50 converts the sensed rotation into a signal which is communicated to the control of the lifting device of lifting platform 20.

Instead of the previously described roller-gauging surface configuration, an alternative measuring device could be provided, which would operate in a contact-free manner. Specifically, a binary scale could be arranged on a surface of upper piston rod segment 46, which would be scanned by any suitable photoelectrical means (not shown). Accordingly, the measuring device may have any possible construction, in order to ensure that lifting platform 20 reaches the desired height, for a particular plate pushing operation, to elevate the desired number of workpiece plates to the plate pushing device 10.

In a preferred embodiment of the invention, guide cylinder 44 is a dual action apparatus. In other words, piston 40 can be driven in both vertical directions of motion, preferably by way of compressed air. As previously described, sensing member 36 of measuring device 34 is positioned directly in front of and adjacent to pushing element 26, relative to the forward feed direction designated by the arrow V, as seen in FIG. 1. When piston 40 occupies its lower position in cylinder 44, as seen in FIG. 1, the lower face of sensing member 36 is substantially in the same horizontal plane with the lower face 32 of pushing element 26.

It is necessary that sensing member 36 and the front edge of lower face 32 of pushing element 26 be arranged as close together as possible, so that, in the presence of highly irregularly contoured workpiece plates, the pushing of workpiece plates will be accomplished in a consistent manner. With the foregoing construction, the possibility of erroneously measuring the height to which lifting platform 20 has been raised, and thus pushing off an incorrect number of workpiece plates is reduced.

In the preferred embodiment of the invention, as seen in FIG. 1, workpiece plates 24 are stacked on top of one another on lifting platform 20. Rather than being perfectly flat plates, workpiece plates 24 may contain numerous irregularities. For example, they may be curved in a wave-like manner along the forward feed direction. The length of one such wave-like curve is indicated in FIG. 1 by the distance designated "b". In order to obtain accurate measurement of the height to which lifting platform must be raised for a particular pushing operation, the horizontal distance between sensing member 36 and pushing element 26 with support roller 30, should be substantially less than the horizontal length "b" of the curve in workpiece plates 24. In FIG. 1, the horizontal distance between the forward-most part of sensing member 36 to the rear side of stack 22 of workpiece plates 24, immediately forward of plate pushing element 26, is designated by horizontal distance "c". As can be seen from FIG. 1, the amount of curve, through the horizontal distance "c" is substantially less than that through longer length "b", and typically, the gross vertical change through the horizontal distance "c" will correspondingly be less than that through the length "b". Accordingly for the most accurate measurement, sensing member 36 should be small, such as spanning only the distance "c" without being so small in area as to cause damage to upper surface 52' such as would be caused by a sharpened point. As lifting platform 20 begins to elevate, sensing member 36 contacts the upper surface 52 of the uppermost workpiece plate 24.

An example of the operation of plate pushing device 10 is as follows. For the present example, it is assumed that two workpiece plates 24 are to be conveyed from lifting platform 20 along the forward feed direction. Piston 40 is first driven into its lower initial position, as seen in FIG. 1. The lower face of sensing member 36 is correspondingly brought into position, substantially in the horizontal plane of lower face 32 of pushing element 26, which is in its lowermost position.

Figure 2:
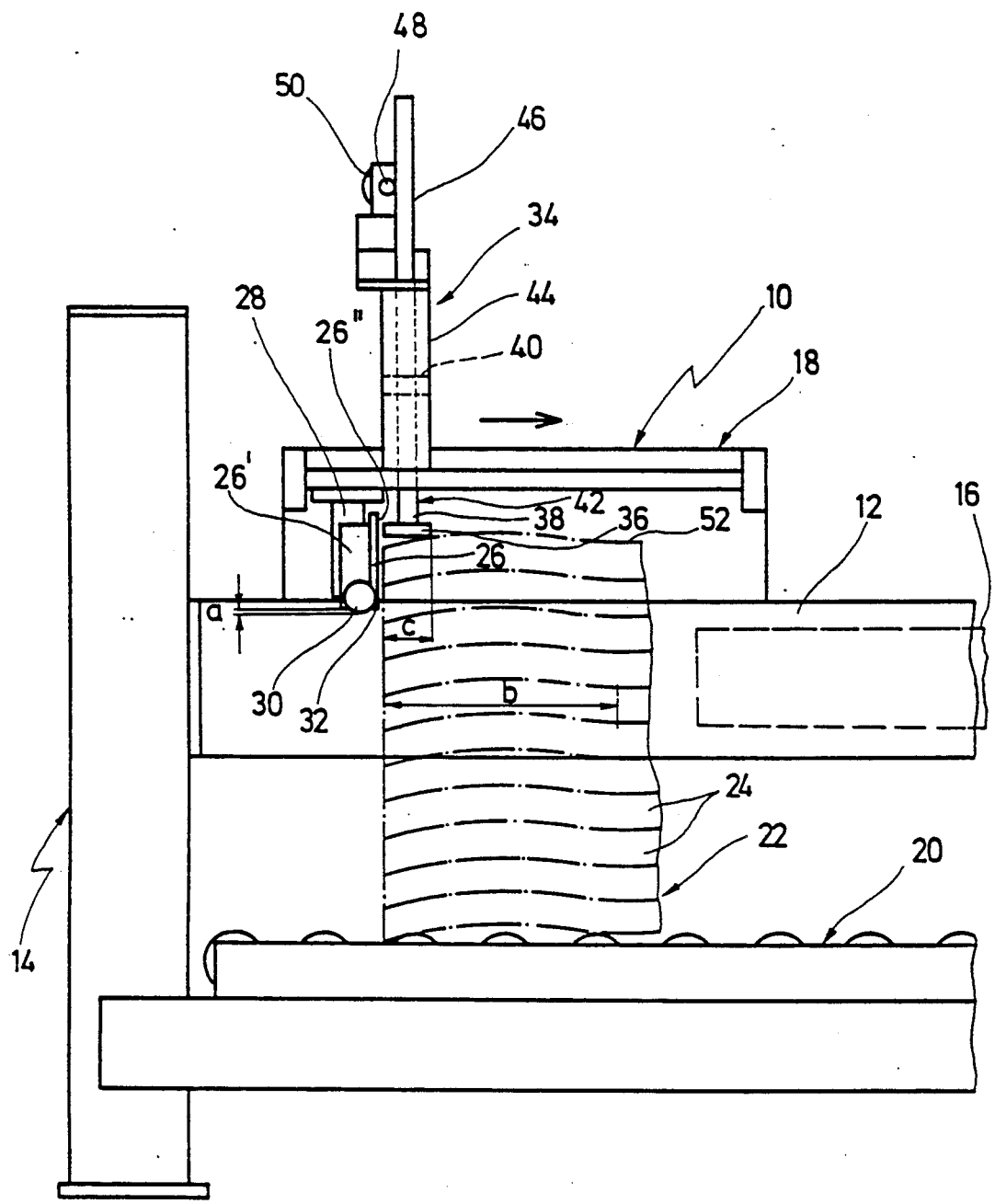
FIG. 2 is a side elevation of the plate pushing device according to FIG. 1, in which the lifting platform has been elevated so as to place a desired number of workpiece plates into position for pushing by the plate pushing device.

Referring now to FIG. 2, once piston 40 has been lowered, the lifting device is activated and the elevation of lifting platform 20 commences. As sensing member 36 makes contact with the upper surface 52 of the uppermost workpiece plate, piston 40 is pushed upwardly by the elevation of lifting platform 20. The upward movement of piston 40 is converted into rotation of roller 48, which rotation is in turn transmitted to incremental rotation sensing device 50. Incremental rotation-sensing device 50 produces a signal, corresponding to the height which lifting platform 20 has been raised. The signal is in turn transmitted to the control of the lifting device (not shown), which compares the value represented by the characteristic signal to a stored value representative of the desired lifting platform height to be attained. Once the desired height has been attained, the control of the lifting device halts the upward movement of lifting platform 20, and the plate pushing operation can commence.

For each pushing operation, for a desired number of workpiece plates to be pushed, the desired height of the lifting platform can be advantageously selected so as to position the lower face 32 of pushing element 26 in a horizontal plane substantially above the lower surface of the lowermost plate to be pushed, to ensure that only the desired number of workpiece plates are pushed.

Figure 3:
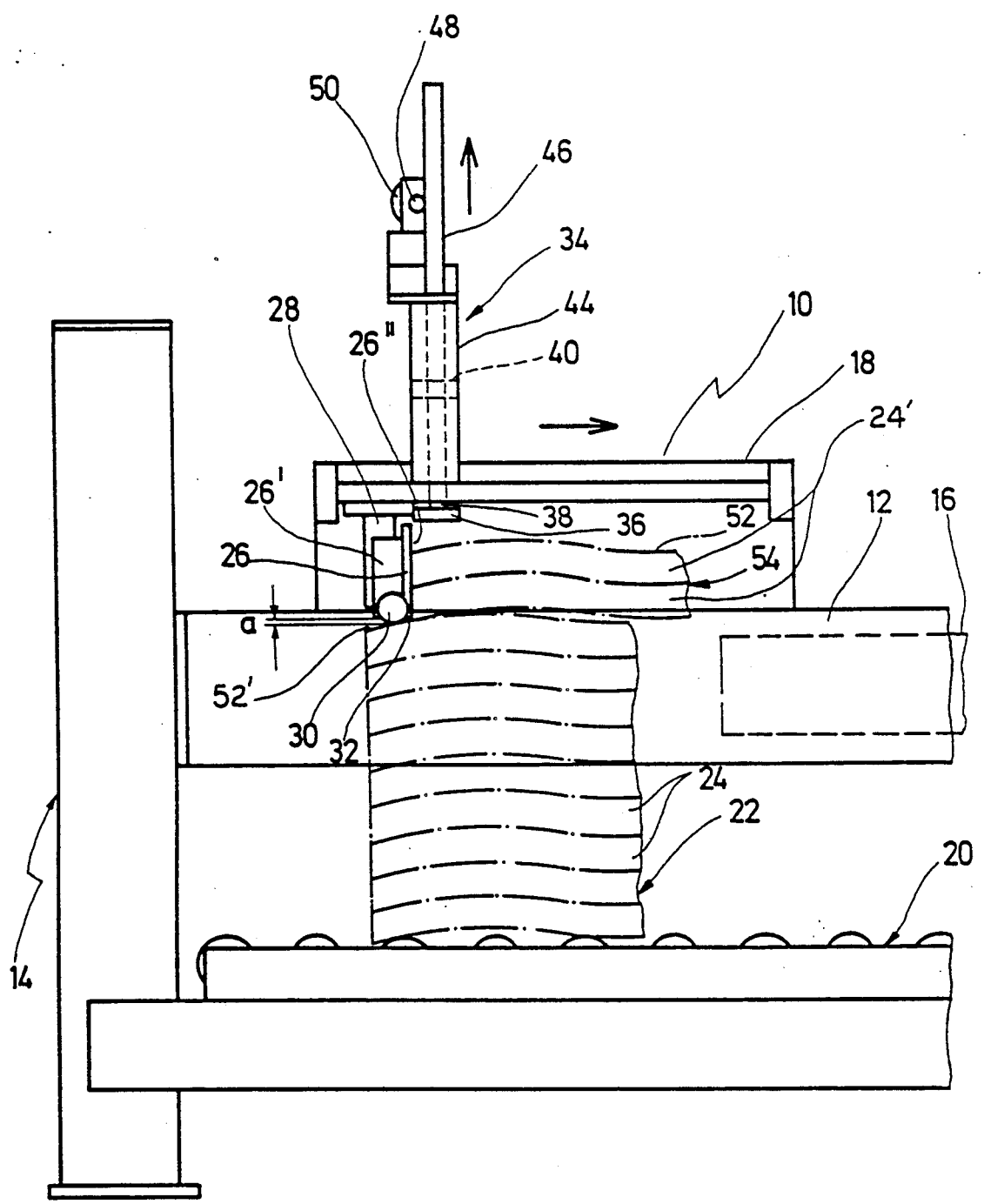
FIG. 3 is a side elevation of the plate pushing device, according to FIGS. 1 and 2, showing the plate pushing device in the process of pushing a pair of stacked workpiece plates onto a machine platform.

Once the lifting operation is completed, piston 40 is driven upwardly, for example, by program controlled compressed air means, into its uppermost position, as seen in FIG. 3. Carriage 18 is driven forward, along the forward feed direction, with plate pushing surface 26" of pushing element 26 moving against the edges of workpiece plates 24'. As workpiece plates 24' are moved along the forward feed direction, the pushing element 26 and support roller 30 are at least initially spaced above upper surface 52' of the uppermost workpiece plate remaining upon lifting platform 20 because of the selected positioning of the lower face 32 of pushing element 26 in a horizontal plane substantially above the lower surface of the lowermost plate to be pushed. However, as the plates are moved along the forward feed direction, the curves or irregularities in the upper surface 52' may decrease that initial spacing in which case support roller 30 rather than lower face 32 of pushing element 26 comes into contact with upper surface 52' of the uppermost workpiece plate remaining upon lifting platform 20. Support roller 30 follows along upper surface 52', over any irregularities in upper surface 52' which it may encounter, carrying with it upwardly or downwardly pushing element 26, always at a distance "a" above upper surface 52' of workpiece plate 24, and is sufficiently close to plate pushing surface 26" to thus prevent damage to upper surface 52' of the remaining workpiece plate by pushing element 26.

After the just-described pushing operation, and the particular workpiece plates 24 have been pushed along the forward feed direction to their next destination, carriage 18 moves back into its initial position, as seen in FIG. 1, and piston 40 is lowered to its initial position, so that lifting platform 20 may be further elevated to bring a subsequent number of workpiece plates into position for pushing along the forward feed direction. Typically the number of plates to be pushed will be the same from pushing operation to pushing operation.

As can be seen from the foregoing description, the plate pushing device of the present invention provides the advantage that it can be adjusted or reset, without manual operation, in order to push a desired number of workpiece plates away from a prepared stack of plates, in an advantageous and efficient manner.

The foregoing description and drawings merely explain and illustrate the invention and the invention is not limited thereto accept insofar as the appended claims are so limited, as those skilled in the art who have the disclosure before them will be able to make modifications and variations therein without departing from the scope of the invention.

What is claimed is:

1. A plate pushing device for use with woodworking machines, such as plate saws, for pushing at least one workpiece plate of a stack of workpiece plates resting on a lifting platform, along a forward feed direction, into said woodworking machine, the height of said lifting platform being adjustable by a lifting device to vary the number of workpiece plates to be pushed during a particular pushing operation, said plate pushing device being operably arranged upon a horizontally-movable carriage, said plate pushing device comprising:

a pushing element operably arranged on said carriage for vertical movement thereon, said pushing element being configured to be applied to an edge of said at least one workpiece plate;

a support roller operably coupled to said pushing element for simultaneous substantially free vertical movement relative to said carriage;

a portion of said support roller extending downwardly a predetermined distance below a lowermost portion of said pushing element;

said support roller supporting said pushing element, said support roller riding along an upper surface of an uppermost remaining workpiece plate of said stack remaining upon said lifting platform during said particular pushing operation to follow any surface irregularities thereon and to effect vertical movement of said pushing element during said pushing operation of said plate along said forward feed direction, so as to maintain said pushing element spaced at least said predetermined distance above said upper surface of said uppermost plate;

a measuring device including a vertically adjustable information element operably arranged on said carriage and operably associated with said lifting platform for detecting the height of said lifting platform and sending a signal to said lifting device, upon attainment of a preselected height, to instruct said lifting device to cease said lifting movement; and said information element is operably arranged on said carriage, forward of said pushing element, relative to said forward feed direction.

2. The plate pushing device according to claim 1 wherein said information element further comprises:

a guide cylinder operably arranged in vertical orientation on said carriage;

said guide cylinder having an upper end opening;

a piston in said guide cylinder, arranged for vertical movement relative thereto;

said piston having an upper end;

an upper piston rod emanating from said upper end of said piston, through and above said upper end opening of said guide cylinder;

said upper piston rod having an upper end;

a gauging member on said a upper end of said upper piston rod;

a roller configured to be rotationally driven by said gauging member when said piston undergoes vertical movement;

said roller being operably connected to an incremental rotation - sensing device;

said incremental rotation -sensing device generating and transmitting a signal to said lifting device in response to vertical movement of said piston, such that when one of said signals, representing attainment of a preselected height for said lifting platform is received by said lifting device, said lifting movement of said lifting platform is interrupted.

* * * * *

UNITED STATES PATENT AND TRADEMARK OFFICE
CERTIFICATE OF CORRECTION

PATENT NO.   : 4,988,265
DATED        : January 29, 1991
INVENTOR(S)  : Burkhard Schwab and Erwin Jenkner It is certified that error appears in the above-identified patent and that said Letters Patent is hereby corrected as shown below:

| | |
|---|---|
| Col. 3, Line 7 | Delete "si as to" and instead insert --so as to-- |
| Col. 4, Line 30 | Delete "parts 26'," and instead insert --part 26'-- |
| Col. 4, Line 53 | Delete "plate plate" and instead insert --plate-- |

Signed and Sealed this

Eighth Day of September, 1992

Attest:

DOUGLAS B. COMER

Attesting Officer — Acting Commissioner of Patents and Trademarks